United States Patent [19]

Thien et al.

[11] E Re. 29,923

[45] Reissued Mar. 6, 1979

[54] SOUND-PROOFED INTERNAL COMBUSTION ENGINE

[75] Inventors: Gerhard Thien; Heinz Fachbach, both of Graz, Austria

[73] Assignee: Hans List, Graz, Austria

[21] Appl. No.: 870,139

[22] Filed: Jan. 17, 1978

Related U.S. Patent Documents

Reissue of:

[64] Patent No.: 3,964,462
Issued: Jun. 22, 1976
Appl. No.: 531,445
Filed: Dec. 10, 1974

[30] Foreign Application Priority Data

May 20, 1974 [AT] Austria ..... 4184/74

[51] Int. Cl.[2] ..... F02B 77/00; F01P 1/02

[52] U.S. Cl. ..... 123/198 E; 123/41.7; 181/204

[58] Field of Search ..... 123/198 E, 198 D, 195 C, 123/195 S, 41.6, 41.7, 41.79; 181/204

[56] References Cited

U.S. PATENT DOCUMENTS

| | | | |
|---|---|---|---|
| 2,177,687 | 10/1939 | Bracken et al. | 123/198 E |
| 2,815,742 | 12/1957 | Kiekhaefer | 123/198 E |
| 3,036,566 | 5/1962 | Dobbertin | 123/198 E |
| 3,521,726 | 7/1970 | Freyn | 123/198 E X |
| 3,530,840 | 9/1970 | Freyn | 123/195 C |
| 3,601,101 | 8/1971 | Thien et al. | 181/204 X |
| 3,612,022 | 10/1971 | Von Bomhard | 123/195 C X |
| 3,684,053 | 8/1972 | Fachbach et al. | 181/204 |
| 3,693,602 | 9/1972 | Thien et al. | 181/204 |
| 3,782,496 | 1/1974 | Thien et al. | 181/204 |
| 3,796,280 | 3/1974 | Thien et al. | 181/204 |

*Primary Examiner*—Ira S. Lazarus
*Attorney, Agent, or Firm*—Watson, Cole, Grindle & Watson

[57] ABSTRACT

An internal combustion engine having a soundproof casing aerated by a blower and divided by at least one partition wall into two cooling air ducts tightly separated from each other, one of the ducts containing all fuel carrying members of the engine, the second duct containing the members of the exhaust system of the engine, the cooling air ducts being admitted by two partial cooling air flows.

3 Claims, 2 Drawing Figures

SOUND-PROOFED INTERNAL COMBUSTION ENGINE

Matter enclosed in heavy brackets [ ] appears in the original patent but forms no part of this reissue specification; matter printed in italics indicates the additions made by reissue.

The present invention concerns a combustion engine having a soundproof casing aerated by a blower, the cooling air being aspirated in divided streams through at least one inlet port and directed over the engine parts to be cooled to at least one outlet port in the casing.

There exists an one-cylinder diesel-engine furnished with a soundproof casing, the aspirated cooling air firstly streaming around the injection pump, and then over the walls of the crank case to the inlet of the blower and being directed from the outlet of the blower over the surface of the cylinder to be cooled and its head to the outlet port in the casing. The drawback of this known arrangement is the fact that leakages near the injection pump will cause leaking fuel to be entrained by the cooling air and contacted with the hot cylinder walls, such involving a certain fire risk.

Further, an air cooled combustion engine of the above-mentioned type is known, comprising a blower mounted on the front part of the casing to blast cooling air firstly into a distribution chamber on one side of the engine and to direct then the air, divided into parallel streams, to the surfaces of the cylinder and the head to be cooled, to the valve chamber arranged above, downstreaming over the oil pan and upstreaming over the injection pump of the engine. The partial streams meeting immediately after the cylinder of the engine to form an united stream of air flowing out to the free atmosphere through the outlet port. The purpose of that arrangement is an individual cooling of the different zones of the engine with regard to their cooling needs. As the partial stream is conducted over the injection pump and streaming close to the hot surfaces of the cylinder and the head before leaving the casing, a certain fire risk can not be excluded.

On all engines with allround closed casings the fire risk is enhanced by the fact that leakages in the fuel or oil system, for example caused by a broken line, cannot be detected in time as observation will be restricted to a minimum by the casing. Casings with forced cooling make the fire risk excessively high if cooling air, enriched with fuel or oil, streams over hot parts of the exhaust system (such as the exhaust manifold, exhaust tubing and possibly exhaust gas supercharger).

This shortcoming of entirely closed combustion engines is eliminated by the present invention and the risk that fuel or other inflammable fluids will be ignited by hot engine parts is avoided. Corresponding to the present invention, this task is met by forming two cooling air ducts inside the casing which are tightly separated by means of at least one partition wall and admitted by parallel streams, one of the ducts comprising the cooling of all fuel carrying parts, the other duct comprising all parts of the exhaust system.

This arrangement ensures that the partial stream, flooding the parts of the fuel system and bare parts of the lubricating system, will not be allowed to contact hot parts of the exhaust system.

It has only to be provided that the loss of head in both cooling air ducts is matched in a way to assure an adequate flow in both ducts and to prevent that part of cooling air, which has already been in contact with fuel carrying parts, to enter the corresponding cooling air duct for the exhaust system.

According to a further extension of the present invention, the cooling air duct for the parts of the exhaust system and eventually of an exhaust gas supercharger may be formed by a partition wall arranged longitudinally to the engine and extending from the upper limiting edge of the exhaust side of the cylinder head to the upper casing and by another partition wall mounted approximately in the plane separating the cylinder block from the cylinder head and extending to the side wall of the casing on the exhaust side. This cooling air duct may have a separate outlet port provided in the front wall of the casing adverted to the blower. In this case, the partition of the encased spaced is provided by partition walls which are to be mounted lightly against the engine, and it has only to be observed that all direct metallic contact between the engine and the casing should be avoided. For this purpose, it is recommended that soundproof tightening fillets be added to the connection points of the partition walls on the engine and the casing. In connection with the last mentioned embodiment of the combustion engine, it is advantageous, corresponding to a further feature of the invention, to mount the outlet port of the cooling air duct including the fuel carrying structure parts on the side wall of the casing on the intake side of the engine. Thus, a divergent outflow of the two streams is obtained, such diminishing the fire risk.

The invention will be explained in the following with reference made to a drawing presenting a realized example.

Figure 1:
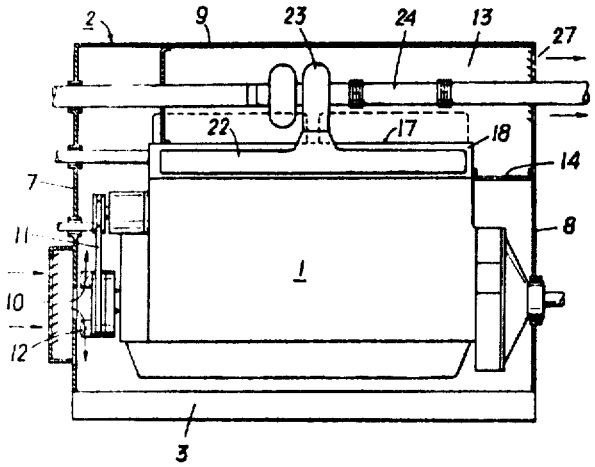
FIG. 1 shows a side-view of a water-cooled six-cylinder, sound proof encased diesel engine according to the present invention, the casing being partially sectioned.
Figure 2:
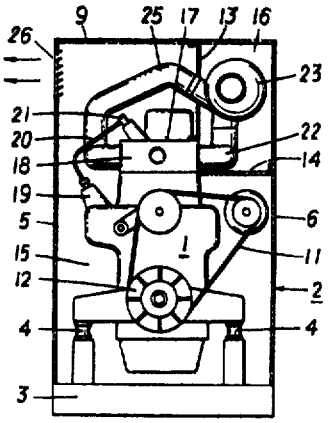
FIG. 2 shows a front-view of the engine illustrated in FIG. 1, the casing also being sectioned.

The illustrated engine 1 comprises a soundproof, entirely enclosed chamber-like casing 2, the bottom of which being, in this case, the base of the engine and acting as a support for the engine 1 by means of soundproof intermediate material 4. The casing 2 consists of the side walls 5 and 6, the front walls 7 and 8 and the upper wall 9.

The front wall 7 includes a cooling air inlet port 10 allowing the cooling air to enter when sucked by blower 12, which is mounted behind the port and driven by the crankshaft of the engine 1 by means of V-belt 11. Then, cooling air flows from the pressure side of the blower 12, for the present without any duct, to the chamber formed by casing 2 and engine 1.

The encased space is divided into two separate cooling air ducts 15 and 16 by means of the partition walls 13 and 14 to allow the blast air to split in two separate streams. The two partition walls 13 and 14 are arranged longitudinally with respect to the engine, wall 13 extending from the upper limiting edge 17 on the exhaust side of cylinder head 18 to the upper casing wall 9 and running through to the front wall 8 of casing 2.

The cooling air duct 15 includes all fuel carrying parts of the combustion engine, in particular, the injector pump 19, the pressure lines 20 and the injectors 21. The second cooling air duct 16 includes all parts belonging to the exhaust system of the engine, that is the exhaust gas manifold 22, the super charger 23 and the exhaust tube 24. The charging air line 25, leading from supercharger 23 to engine 1, penetrates the partition wall 13 by means of an appropriate hole.

The cooling air duct 15 has a suitable cooling air outlet port 26 provided in the casing side wall 5 on the intake side. The oulet port 27 of cooling air duct 16 is arranged on front wall 8 of casing 2 opposite to inlet port 10.

When leakages occur in the fuel or lubricating systems of the engine, the partitioning of the encased space avoids inflammable fluids or vapours being transferred by the cooling air to the hot surfaces of the exhaust system causing acute fire danger. The sections of the cooling air ducts are to be matched in such a way that an equal and parallel flow through the two ducts is maintained under all circumstances.

What I claim is:

1. An internal combustion engine having a soundproofing casing therearound and defining a chamber therebetween through which air is circulated from a blower mounted adjacent to an inlet opening in a first front wall of the casing to remove generated heat from the engine, the improvement in which comprises at least one partition wall dividing the chamber into two separate cooling air ducts which are sealed from each other, a first one of the cooling air ducts containing all fuel carrying parts of the engine including a fuel injection pump, fuel pressure pipes and fuel injection nozzles, the second one of the cooling air ducts containing at least the major portions of those components of the engine exhaust system which are located within the soundproofing casing including an exhaust manifold and an exhaust tube, and the soundproofing casing having two separated cooling air outlet ports therein each of which is connected to a separate one of the two cooling air ducts whereby any combustible materials carried by the cooling air from the fuel carrying parts of the engine are prevented from encountering hot exhaust system surfaces thereby significantly reducing any danger of fire.

2. An internal combustion engine according to claim 1, wherein the engine includes a cylinder block, a cylinder head and an exhaust manifold extending along and in front of a side wall of the cylinder head, the side wall having upper and lower limiting edges, an upright first partition wall extending from the upper limiting edge of the cylinder head side wall to an upper wall of the soundproofing casing and a second partition wall extending from the lower limiting edge of the cylinder head side wall to a first casing side wall facing the exhaust manifold the two partition walls forming, in connection with the soundproofing casing, the second cooling air duct.

3. An internal combustion engine according to claim 2, wherein the soundproofing casing further comprises a second side wall facing the intake side of the cylinder block of the engine, the cooling air outlet port of the first cooling air duct containing the fuel carrying parts being provided in the second side wall of the casing, and a second front wall opposite that containing the blower, the cooling air outlet port of the second cooling air duct containing the exhaust manifold being provided in the second front wall of the casing.

* * * * *